United States Patent [19]
Penney et al.

[11] Patent Number: 5,569,399
[45] Date of Patent: Oct. 29, 1996

[54] LASING MEDIUM SURFACE MODIFICATION

[75] Inventors: Carl M. Penney, Saratoga Springs; Joseph P. Chernoch, Scotia; Carl E. Erikson, Schenectady, all of N.Y.

[73] Assignee: General Electric Company, Schenectady, N.Y.

[21] Appl. No.: 376,196

[22] Filed: Jan. 20, 1995

[51] Int. Cl.⁶ ................................................ B23K 26/02
[52] U.S. Cl. ............................ 219/121.69; 219/121.73; 219/121.82; 219/121.83; 219/121.85; 264/400; 437/173
[58] Field of Search ................... 219/121.68, 121.69, 219/121.73, 121.75, 121.82, 121.83, 121.85; 264/400, 482; 437/129, 173; 216/65, 94; 372/41, 43, 45; 156/643.1; 250/492.1

[56] References Cited

U.S. PATENT DOCUMENTS

| | | | |
|---|---|---|---|
| 4,280,107 | 7/1981 | Scifres et al. | 372/99 |
| 4,894,115 | 1/1990 | Eichelberger et al. | 219/121.69 |
| 4,918,703 | 4/1990 | Kukla | 372/66 |
| 4,948,940 | 8/1990 | Ruckl | 219/121.68 |
| 5,008,513 | 4/1991 | Najafi-Sani et al. | 219/121.69 |
| 5,031,183 | 7/1991 | Waters | 372/45 |
| 5,137,844 | 8/1992 | Chiulli | 437/129 |
| 5,233,157 | 8/1993 | Schreiber et al. | 219/121.68 |
| 5,335,237 | 8/1994 | Zapata | 372/33 |
| 5,420,879 | 5/1995 | Kawarada et al. | 372/41 |
| 5,436,192 | 7/1995 | Epler et al. | 437/129 |
| 5,464,960 | 11/1995 | Hall et al. | 219/121.69 |
| 5,483,038 | 1/1996 | Ota et al. | 219/121.69 |

*Primary Examiner*—Tu Hoang
*Assistant Examiner*—Gregory L. Mills
*Attorney, Agent, or Firm*—Paul R. Webb, II

[57] ABSTRACT

This invention relates to the modification of lasing medium surfaces, such as crystals, to reduce the internal reflections that contribute to amplified spontaneous emission (ASE) losses. A laser ablation treatment involves focusing an optical irradiation means on a target surface having desired ablation pattern and ablating the target surface according to the selected ablation pattern. A cross-hatch pattern on the target surface is secured by the target surface being mounted onto a precision motor driven translation stage and stepped throughout the desired ablation pattern. The optical irradiation means are oriented initially at 45° to the target surface length and subsequently rotated by 90°.

3 Claims, 4 Drawing Sheets

LASING MEDIUM SURFACE MODIFICATION

BACKGROUND OF THE INVENTION

This invention relates to a novel method for treating lasing medium surfaces, often crystal surfaces, to reduce internal reflections which contribute to amplified spontaneous emission (ASE) losses. More particularly, this method uses a laser ablation treatment of lasing medium surfaces to reduce said internal reflections. As used herein. "ablation" refers to the physical process of material removal which may include a combination of melting, vaporization, sublimation or high temperature chemical reactions, among other processes.

The purpose of lasing medium surface treatment is to produce sufficient surface roughness to spread the internal reflection angles and to decrease the fraction of light which is internally reflected within the lasing medium, without weakening the mechanical strength of said lasing medium. Strength maintenance within the lasing medium is vitally important because the lasing medium must withstand high mechanical stresses created by thermal gradients which may arise during use.

In the past, acids;chemical etching has been utilized for treating lasing medium surfaces to reduce the internal reflections which contribute to amplified spontaneous emission (ASE) losses. However, acid/chemical etching is a lengthy process, and is often difficult to control. Furthermore, acid/chemical etching often results in insufficient surface roughness, thereby reducing the efficiency and power attainable from each lasing medium to an unacceptable level.

It is apparent from the above that there exists a need in the art for a method of treating lasing medium surfaces to reduce the internal reflection, which is fast, easily controlled, and produces sufficient surface roughing. It is a purpose of this invention, to fulfill this and other needs in the art in a manner more apparent to the skilled artisan once given the following disclosure.

SUMMARY OF THE INVENTION

The above-mentioned needs are met by the present invention which relates to a novel method for treating lasing medium surfaces, often crystal surfaces, to reduce internal reflections which contribute to amplified spontaneous emission (ASE) losses. More particularly, said method uses a laser ablation treatment of said lasing medium surfaces to reduce said internal reflections.

The preferred method of treating lasing medium surfaces, according to this invention, offers the following advantages: good economy; ease of use; excellent speed; improved control; and effective surface roughness. In fact, in many of the preferred embodiments, these factors of use; control; speed; and surface roughness, are optimized to an extent considerably higher than heretofore achieved in prior, known methods of treating lasing medium surfaces to reduce internal reflections.

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
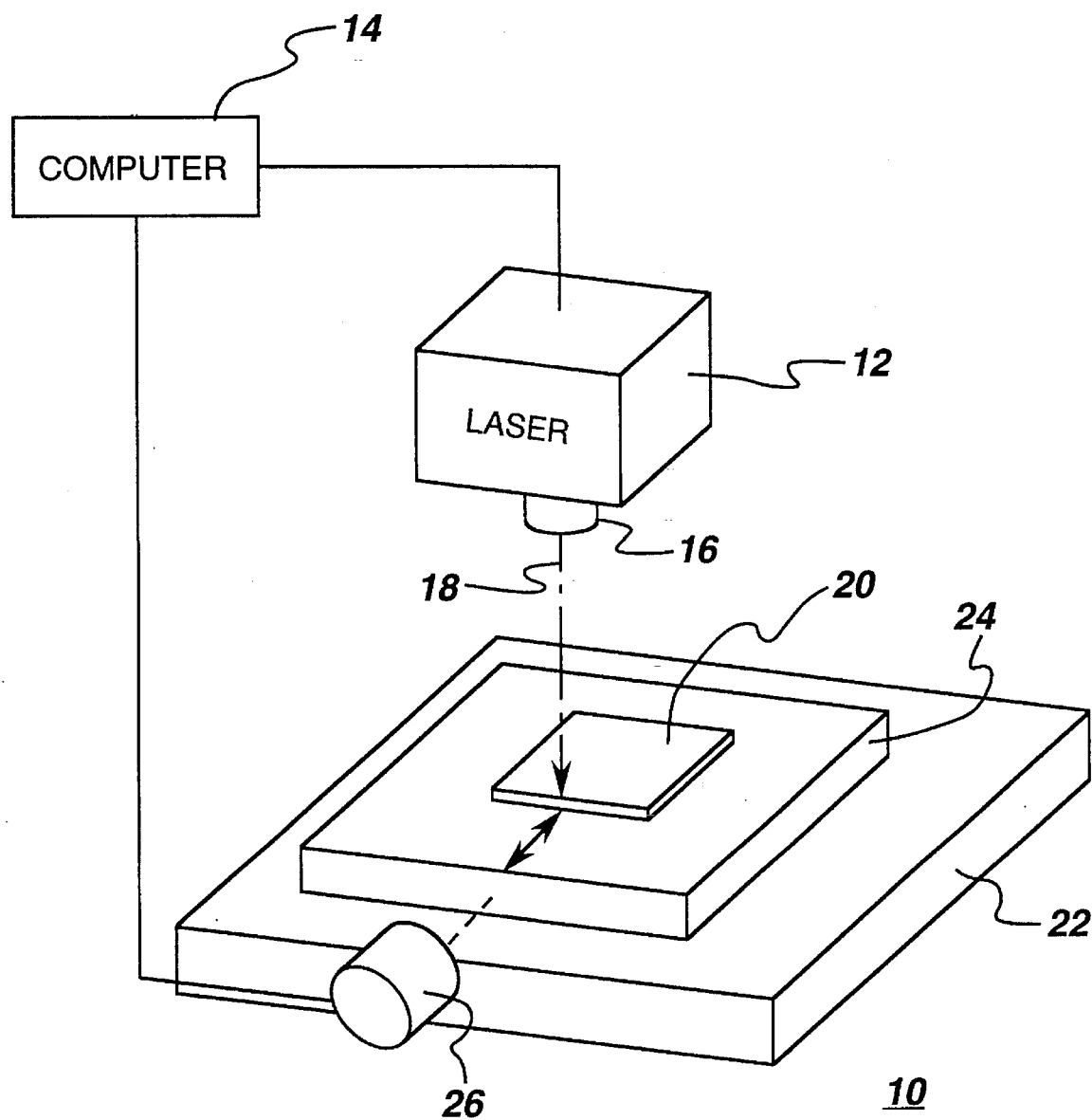
FIG. 1 is a schematic view of an apparatus for practicing the method of the instant invention.

Apparatus 10 comprises an optical irradiation means shown in the form of an Ar-F excimer laser 12 which produces an output at 193 nm for ablating a surface. A suitable software program provided from a computer 14 controls laser 12. Suitable optics 16 including a cylindrical lens focus a laser beam 18 upon a lasing medium target surface 20. A support 22 is provided upon which a precision motor driven translation stage 24 is positioned. The target surface 20 is mounted upon the translation stage 24.

Laser 12 is mounted above translation stage 24 and focused upon target surface 20. Translation stage 24 is driven in the desired pattern by means of a motor 26 which is shown controlled by computer 14.

In operation, a laser beam 18 from an Ar-F excimer laser 12 is focused on a target surface 20. The desired ablation, pattern is selected. Target surface 20 is mounted onto a precision motor driven translation stage 24 which is positioned on a support 22. Stage 24 is stepped throughout the desired ablation pattern length.

Figure 2:
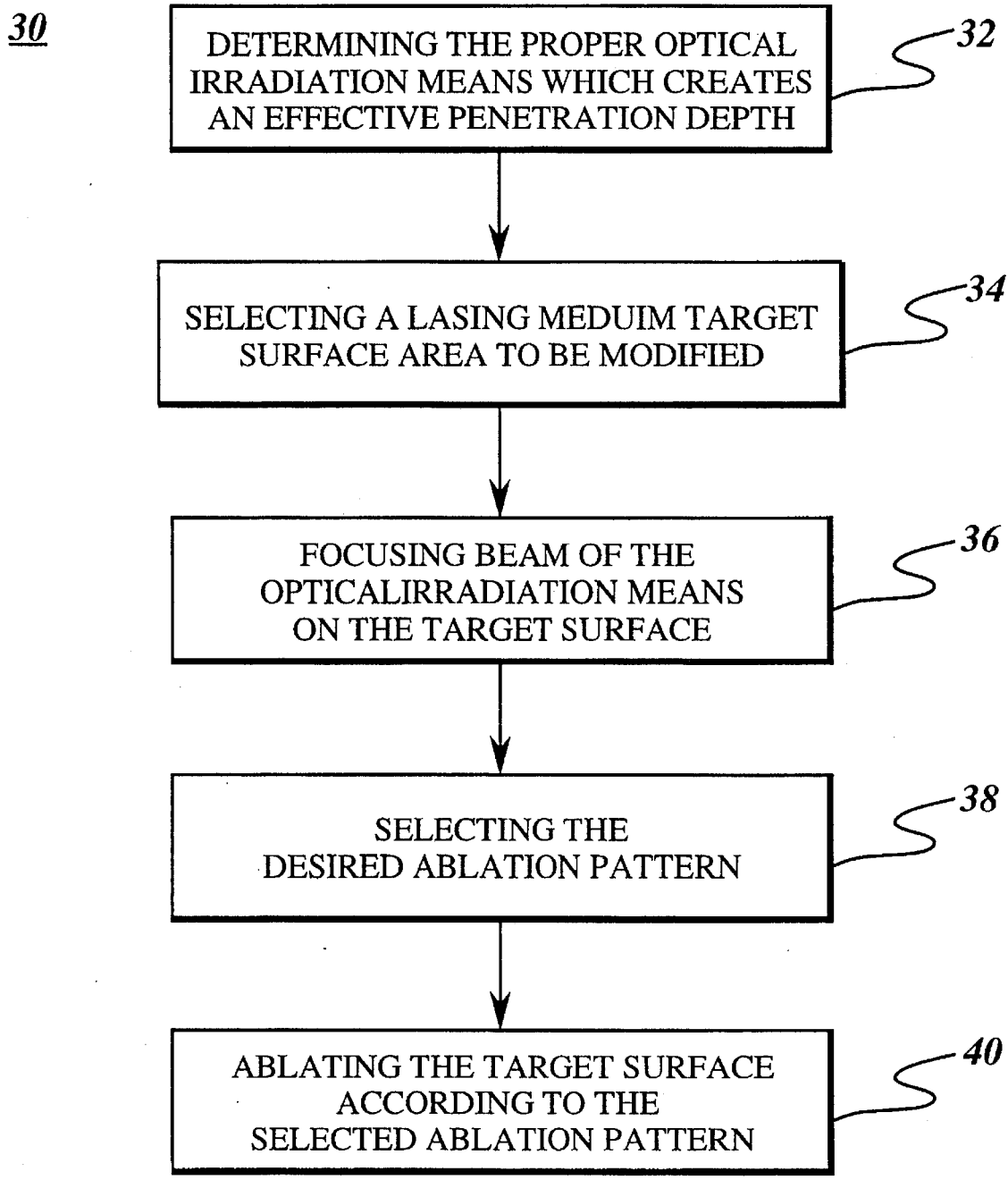
FIG. 2 is a flowchart illustrating a sequence of method steps, in accordance with the instant invention.

Referring to FIG. 2 of the drawings, a flow chart briefly illustrates the method disclosed within the instant invention.

Specifically referring to flow chart 30, the first step to be taken in order to initiate this lasing medium surface modification process is to determine the appropriate optical irradiation means for the process 32. The appropriate optical irradiation means should create optical irradiation with a temporal dependence and a wavelength which produces proper penetration into the lasing medium.

A problem occurs when improper irradiation causes a substantial depth of material to be heated at least to its melting point but then fails to remove all of the material. This situation is undesirable because structural discontinuities will form in the once molten material, causing stress concentrations to form which lower the materials strength.

Through experimentation, it has been learned that a Kr-F (Krypton-Fluoride) excimer laser producing output at 248 nm results in improper penetration and causes the beforementioned structural discontinuities. Subsequently, tests have demonstrated that the use of an Ar-F (Argon-Fluoride) excimer laser producing output at 193 nm has the desired characteristics which are needed for this process to be effective. The absorption depth of the Ar-F excimer laser is at least ten times smaller than that of the Kr-F excimer laser. Accordingly, lasers having similar characteristics and penetration depths as the AR-F excimer laser has, may be effective substitutes.

The next step is to select a lasing medium target surface area to be treated 34. The lasing media used as targets in the initial tests were crystal slabs (YAG crystal slabs), in the form of extended rectangular posts, with nominal dimensions of 45 mm×6 mm×3 mm. Said lasing medium target may be mounted onto a precision motor driven translation stage.

The user then must properly focus the beam of the optical irradiation means on said targeted surface 36. The material removal is determined to a significant degree by the fluence of the optical irradiation which is the energy per unit area, typically in units of joules per square centimeter.

The beam dimensions of a typical Ar-F excimer laser, producing output at 193 nm, are 8 mm vertically by 22 mm horizontally. Said beam has a divergence of about 1 mR in the vertical direction and 3 mR in the horizontal direction. The beam may be focused into a line using a 50 mm focal length cylindrical lens aligned to focus the narrow dimension of the beam. Over a distance of less than 50 cm to the target, very little horizontal distortion of the beam will occur, allowing the beam width to remain close to its initial value of 22 mm wide. The vertical dimension is focused down to a width (w) given by the product of the lens focal length and the estimate beam divergence in the narrow direction:

$w$=lens focal length * beam divergence in the vertical narrow direction $w$=(50 mm)*(1*10$^{-3}$ mR)=5*10$^{-2}$ mm.

Thus, the initial fluence of the beam is increased by the ratio of initial beam area to focused beam area, given by:

initial beam area/focused beam area (8 mm)*(22 mm)/(5*10$^{-2}$)*(22 mm)=1.6*10$^2$.

The Ar-F excimer laser, producing output at 193 nm, operates at pulse energies from 1 mJ to 4 mJ. Therefore, the initial fluence varies from:

(1 mJ)/(0.8 cm*2.2 cm)=0.57 mJ/cm$^2$ to four times that value, or (4 mJ)/(0.8 cm*2.2 cm)=2.3 mJ/cm$^2$.

Taking into account the increase in this quantity caused by the cylindrical lens focus, the exposure fluence is estimated at 160 mJ/cm$^2$ to 560 mJ/cm$^2$. These values are close to the threshold of ablation for many materials. In one run at a slightly lower fluence, no ablation was visibly evident.

In order to obtain this rate for the exposure fluence, the cylindrical lens should be focused with substantial care. The depth of focus (D) from ray tracing is given by:

$D=2wf/W$, where w is the focal width, f is the focal distance and W is the width of the unfocused beam at the lens. The depth of focus (D) can be interpreted as the distance over which the lens to surface distance can vary about the focal distance without a significant change in the fluence at the surface.

Because the depth of focus (D) is so small, some special precautions to achieve and maintain focus may be taken.

The optimum focal distance may be determined by ablating well separated stripes with 1 mil steps in lens to surface distance. Microscopic inspection of the resulting ablation stripes may be used to determine the optimum focal distance.

An indicator of lens to surface distance could be installed to show any departure from focus, so that a quick inspection through an optical comparitor or a long working distance microscope could be used to set and verify distance. Further, a control element could be added to maintain proper focus after receiving a signal from the indicator if the distance were to change.

Laser pulse energy may be measured by removing the focusing lens and substituting a thermopile detector operating in average power mode. In this configuration, pulse energy is given by dividing average power by pulse repetition rate. However, an alternative method may be substituted because the laser pulse energy varies substantially during this process creating an accuracy problem for this type of measurement, especially because of the close proximity to the threshold ablation rate.

This method may be replaced by a device which can measure the energy of each pulse during ablation. One such device is a pyroelectric detector.

The user must next determine a desired ablation pattern 38. Acid/chemical etching produces a surface roughness pattern that usually appears random. Although this type of pattern can be produced by ablation, it is more efficient to generate a pattern of closely spaced lines, thereby requiring only one dimension of scan.

A pattern of regularly spaced lines will diffract an incident beam into a line of spots perpendicular to the pattern lines. Since the distribution of these spots depends only on the line spacing, the spacing may be calculated so as to direct light away from areas which would contribute to amplified spontaneous emission (ASE) losses. Even if this distribution is not calculated, the pattern has a useful effect in that it sharply reduces specular (zero-order) reflection.

An alternative ablation pattern which may be efficiently created is a cross-hatch pattern. This cross-hatch pattern contains two superimposed line patterns rotated 90 degrees with respect to each other. This pattern diffracts a collimated beam into a two dimensional matrix of spots, thereby further reducing the specular (zero-order) reflection and the amplified spontaneous emission (ASE) losses. This cross-hatch pattern may be produced by orienting the laser line at 45° to the long dimension, stepping the translation stage throughout he desired pattern length, and then repeating this operation with the laser line rotated by 90°.

Finally, the user should begin the surface modification of the selected surface according to the selected ablation pattern 10. This step may be controlled by a computer program set up to move the translation stage a set distance, trigger one or more laser pulses, then repeat the move and trigger operation a set number of times.

EXAMPLE

Figure 3:
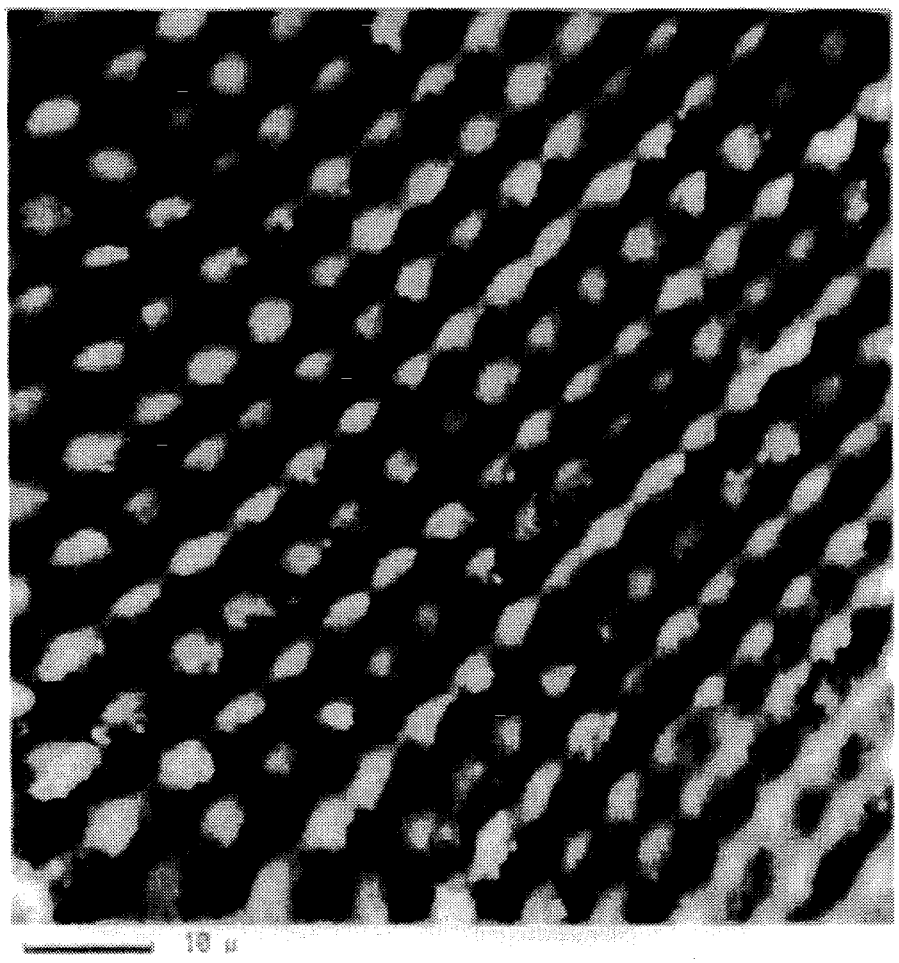
FIG. 3 is an exploded image of a YAG crystal surface subsequent to surface modification by the method disclosed within the instant invention.
Figure 4:
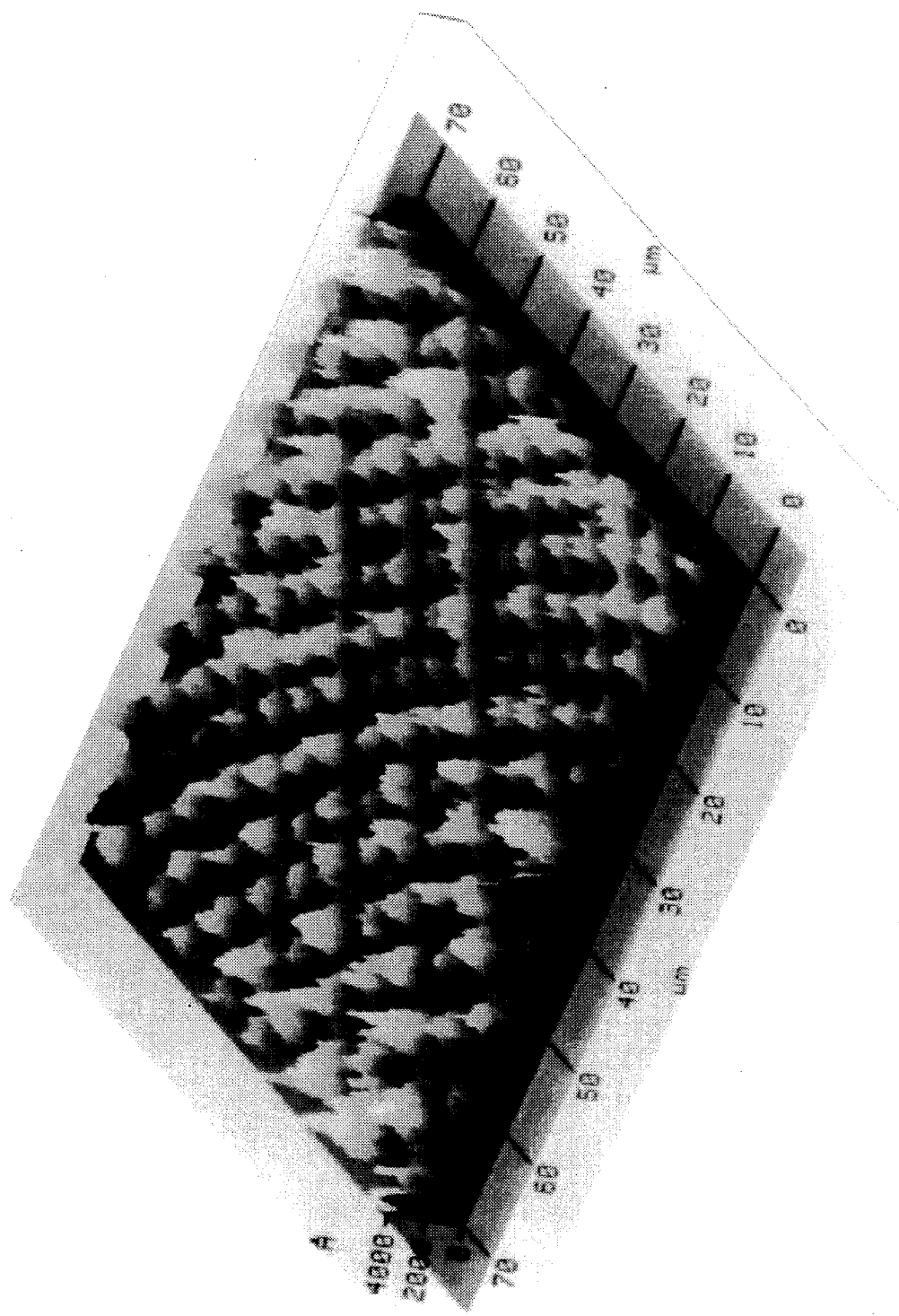
FIG. 4 is a prospective view of a YAG crystal surface subsequent to surface modification by the method disclosed within the instant invention.

Tests were preformed with the Ar-F excimer laser operating at an initial fluence near 4 mJ per pulse for 1 to 10 pulses, producing ablation stripes that were clearly visible under a microscope. (See FIGS. 3 & 4). After 10 pulses a stripe with width of 10 microns and an average depth of 0.2 microns was produced, with a near triangular cross-section. The specific material removal rate can be estimated at:

$$R = \frac{(1 * 10{-3} \text{ cm}) * (2 * 10{-5} \text{ cm}) * (2 \text{ cm}) * 0.5}{4 \text{ mJ/pulse} * 10 \text{ pulses}} = 5 * 10{-7} \text{ cm}^3/\text{Joule},$$

which is quite high. Similar experiments on titanium produced a rate of 1.4*10$^{-7}$ cm3/Joule.

Groove depth was measured using an atomic force microscope for exposures of 1, 10, and 100 pulses with energies near 4 mJ. The material specific removal rate appears to remain constant over the first ten pulses but has dropped to about 65% of the initial rate average over 100 pulses.

A tensile strength test was applied to the ablated sides of two posts until they broke. The first, ablated with a line pattern, with a total laser energy per pulse of 1 mJ, broke outside the pattern at 46.4 Kpsi. The second, ablated with a cross-hatch pattern, with a total laser energy per pulse of 4 mJ per pulse, broke at 27.1 Kpsi. The average for a large group of controls tested was 48.5 Kpsi+−6.6 Kpsi standard deviation.

What is claimed is:

1. A method of lasing medium surface modification comprising the steps of:

choosing an optical irradiation means having a penetration depth for surface roughness;

selecting a target surface to be modified;

providing appropriate focus of said optical irradiation means on said target surface;

selecting a desired ablation pattern;

ablating separated strips while making 1 mil steps in lens to surface distance between each strip; and inspecting the resulting ablation strips to determine an optimum focal distance.

2. A method of lasing medium surface modification comprising the steps of:

choosing an optical irradiation means having a penetration depth for surface roughness;

selecting a target surface to be modified;

providing appropriate focus of said optical irradiation means on said target surface;

selecting a desired ablation pattern of a cross-hatch pattern;

mounting the target surface onto a precision motor driven translation stage;

orienting the optical irradiation means at 45° to the target surface length;

stepping the translation stage throughout the desired ablation pattern length; and repeating this operation with the optical irradiation means rotated by 90°.

3. A method of lasing medium surface modification comprising the steps of:

selecting a target surface to be modified;

focusing a beam of an Ar-F excimer laser, producing output at 193 nm, on the target surface;

selecting a desired ablation pattern of a cross-hatch pattern;

mounting the target surface onto a precision motor driven translation stage;

orienting a laser line at 45° to the target surface length;

stepping the translation stage throughout the desired ablation pattern length; and repeating this operation with the laser line rotated by 90°.

* * * * *